US012196531B2

(12) United States Patent
Ahle et al.

(10) Patent No.: US 12,196,531 B2
(45) Date of Patent: Jan. 14, 2025

(54) PROTECTIVE CABINET

(71) Applicant: ProtectEd Solutions LLC, Acworth, GA (US)

(72) Inventors: Jacob Ahle, Baltimore, MD (US); Thomas Ankenbauer, Portage, MI (US); Timothy Cahalin, Stockton, NJ (US); Peter Facchini, Canton, GA (US)

(73) Assignee: ProtectED Solutions LLC, Acworth, GA (US)

( * ) Notice: Subject to any disclaimer, the term of this patent is extended or adjusted under 35 U.S.C. 154(b) by 335 days.

(21) Appl. No.: 17/374,270

(22) Filed: Jul. 13, 2021

(65) Prior Publication Data

US 2022/0018635 A1 Jan. 20, 2022

Related U.S. Application Data

(60) Provisional application No. 63/053,109, filed on Jul. 17, 2020.

(51) Int. Cl.
*F41H 5/14* (2006.01)
*A47B 47/00* (2006.01)
(Continued)

(52) U.S. Cl.
CPC ............... *F41H 5/14* (2013.01); *A47B 47/00* (2013.01); *A47B 47/03* (2013.01); *A47B 55/00* (2013.01);
(Continued)

(58) Field of Classification Search
CPC ........... F41H 5/14; A47B 47/00; A47B 47/03; A47B 55/00; A47B 95/008; A47B 2097/008; A47F 5/08; E05C 1/14
(Continued)

(56) References Cited

U.S. PATENT DOCUMENTS

| | | | |
|---|---|---|---|
| 377,732 | A | 2/1888 | Adams |
| 2,772,450 | A | 12/1956 | Stewart |

(Continued)

FOREIGN PATENT DOCUMENTS

| | | |
|---|---|---|
| CN | 2281394 Y | 5/1998 |
| CN | 2486679 Y | 4/2002 |

(Continued)

OTHER PUBLICATIONS

Web Urbanist, "Hidden Beauty: Savvy Secret Room & Passageway Engineers," Internet article, archived on Jan. 15, 2013 at https://web.archive.org/web/20130117054521/http://weburbanist.com/2013/01/15/hidden-beauty-savvy-secret-room-passageway-engineers/, pp. 1-4.

(Continued)

*Primary Examiner* — Janet M Wilkens
*Assistant Examiner* — Timothy M Ayres
(74) *Attorney, Agent, or Firm* — Morse, Barnes-Brown & Pendleton, P.C.; Sean D. Detweiler, Esq.

(57) ABSTRACT

Disclosed is a protective cabinet in the form of a moveable furniture unit that has structure to enable moving the furniture unit into a locked position in which it blocks a point of ingress of a would-be assailant, such as a door or window into a space. In certain configurations, the furniture unit includes protective, hardened material, such as a ballistic material that provides increased protection against fire from a weapon, such as may be encountered in an active shooter event. For example, the cabinet may be used on a daily basis inside of a classroom, and may be moved and locked into a position in front of a doorway, window, or other ingress or egress point of the classroom during an active shooter or other threat event to both block the ingress/egress point and provide ballistic protection against weapons fire from outside of the room. The back side of the cabinet (which faces
(Continued)

the outside of the room that is being protected) may incorporate a psychological deterrent, such as a reflective surface or a calming message, which provides an added level of deterrence against an attack inside of the room.

24 Claims, 12 Drawing Sheets

(51) Int. Cl.

| | |
|---|---|
| ***A47B 47/03*** | (2006.01) |
| ***A47B 55/00*** | (2006.01) |
| ***A47B 95/00*** | (2006.01) |
| ***A47F 5/08*** | (2006.01) |
| ***E05C 1/14*** | (2006.01) |
| *A47B 97/00* | (2006.01) |

(52) U.S. Cl.
CPC .............. *A47B 95/008* (2013.01); *A47F 5/08* (2013.01); *E05C 1/14* (2013.01); *A47B 2097/008* (2013.01)

(58) Field of Classification Search
USPC ................................. 312/245, 286, 287, 204
See application file for complete search history.

(56) References Cited

U.S. PATENT DOCUMENTS

| | | | | | |
|---|---|---|---|---|---|
| 4,036,541 | A | | 7/1977 | Kantor | |
| 4,060,039 | A | | 11/1977 | Lagarrigue | |
| 4,116,507 | A | * | 9/1978 | Marusiak, Jr. | A47B 81/00 237/79 |
| 4,180,298 | A | | 12/1979 | Borgerson, Jr. | |
| 4,341,165 | A | | 7/1982 | Calandritti et al. | |
| 4,852,503 | A | | 8/1989 | Lichter | |
| 5,293,807 | A | | 3/1994 | Hajdu | |
| 5,487,237 | A | | 1/1996 | Martin, Jr. | |
| 5,577,819 | A | * | 11/1996 | Olsen | A47B 67/00 312/209 |
| 5,579,613 | A | | 12/1996 | Carr | |
| 5,893,235 | A | | 4/1999 | Almond | |
| 5,939,658 | A | | 8/1999 | Muller | |
| 6,202,454 | B1 | | 3/2001 | Nakasuji | |
| 6,381,910 | B1 | | 5/2002 | Katz | |
| 6,588,705 | B1 | | 7/2003 | Frank | |
| 6,622,607 | B1 | | 9/2003 | Miller | |
| 6,634,727 | B2 | * | 10/2003 | Torres | E06B 7/34 49/390 |
| 6,718,706 | B2 | | 4/2004 | Katz | |
| 6,907,811 | B2 | | 6/2005 | White | |
| 7,389,718 | B1 | | 6/2008 | Carter et al. | |
| 7,849,781 | B2 | | 12/2010 | White | |
| 8,015,910 | B1 | | 9/2011 | Fuqua et al. | |
| 8,443,737 | B2 | | 5/2013 | Todd | |
| 8,701,544 | B2 | | 4/2014 | Peters et al. | |
| 8,850,949 | B1 | | 10/2014 | Lopez | |
| 9,010,230 | B2 | | 4/2015 | Peters | |
| 9,010,231 | B1 | | 4/2015 | Cohn et al. | |
| 9,010,254 | B1 | * | 4/2015 | Kyler | A47B 85/06 108/6 |
| 9,188,411 | B2 | | 11/2015 | Jacobsen | |
| 9,310,170 | B1 | | 4/2016 | Basewitz | |
| 9,528,797 | B2 | | 12/2016 | Harwood et al. | |
| 11,098,527 | B2 | * | 8/2021 | Barker | E06B 7/34 |
| 2003/0213359 | A1 | | 11/2003 | Kropf | |
| 2006/0283361 | A1 | | 12/2006 | Bartel et al. | |
| 2008/0263958 | A1 | | 10/2008 | Edson | |
| 2010/0297388 | A1 | | 11/2010 | Dagher et al. | |
| 2011/0162564 | A1 | | 7/2011 | Heim et al. | |
| 2012/0152096 | A1 | | 6/2012 | Peters | |
| 2012/0279134 | A1 | | 11/2012 | Battenfield | |
| 2013/0087675 | A1 | | 4/2013 | Miller | |
| 2013/0192499 | A1 | | 8/2013 | Bartel | |
| 2014/0053717 | A1 | | 2/2014 | Bowen | |
| 2014/0208993 | A1 | | 7/2014 | Spransy | |
| 2015/0096471 | A1 | | 4/2015 | Kyler | |

FOREIGN PATENT DOCUMENTS

| | | | |
|---|---|---|---|
| CN | 201205092 | Y | 3/2009 |
| CN | 102209828 | A | 10/2011 |
| CN | 102462195 | A | 5/2012 |
| CN | 202312116 | U | 7/2012 |
| CN | 202536648 | U | 11/2012 |
| CN | 202567327 | U | 12/2012 |
| CN | 202800637 | U | 3/2013 |
| CN | 202858388 | U | 4/2013 |
| CN | 102414390 | B | 8/2014 |
| DE | 19805638 | A1 | 8/1999 |
| DE | 202005014353 | U1 | 1/2007 |
| DE | 102011088339 | A1 | 6/2013 |
| EP | 0163578 | B1 | 2/1988 |
| EP | 0254088 | A3 | 8/1988 |
| EP | 0246989 | B1 | 2/1991 |
| EP | 0323361 | B1 | 9/1992 |
| EP | 0546534 | B1 | 1/1995 |
| EP | 0889184 | A2 | 1/1999 |
| EP | 0900908 | A2 | 3/1999 |
| EP | 1211376 | A2 | 6/2002 |
| EP | 1586730 | A2 | 10/2005 |
| EP | 1736623 | A2 | 12/2006 |
| EP | 1887172 | A2 | 2/2008 |
| EP | 2239402 | A2 | 10/2010 |
| EP | 2278100 | A1 | 1/2011 |
| EP | 2305931 | A1 | 4/2011 |
| EP | 2650459 | B1 | 6/2018 |
| ES | 182168 | A1 | 4/1948 |
| GB | 1586351 | A | 3/1981 |
| JP | 2826284 | B2 | 11/1998 |
| JP | 2004270386 | A | 9/2004 |
| JP | 2004278260 | A | 10/2004 |
| JP | 3601918 | B2 | 12/2004 |
| JP | 2005245741 | A | 9/2005 |
| JP | 2005330708 | A | 12/2005 |
| JP | 4166006 | B2 | 10/2008 |
| JP | 4180905 | B2 | 11/2008 |
| JP | 4222813 | B2 | 2/2009 |
| JP | 4302542 | B2 | 7/2009 |
| JP | 4380830 | B2 | 12/2009 |
| JP | 4620442 | B2 | 1/2011 |
| JP | 2013147873 | A | 8/2013 |
| JP | 5532373 | B2 | 6/2014 |
| JP | 5571061 | B2 | 8/2014 |
| JP | 2014530688 | A | 11/2014 |
| JP | 6054776 | B2 | 12/2016 |
| JP | 6055210 | B2 | 12/2016 |
| JP | 6102209 | B2 | 3/2017 |
| KR | 830001933 | A | 5/1983 |
| KR | 900006632 | A | 5/1990 |
| KR | 940007996 | A | 4/1994 |
| KR | 950002381 | A | 1/1995 |
| KR | 950006187 | A | 3/1995 |
| KR | 20120007182 | A | 1/2012 |
| KR | 20120059936 | A | 6/2012 |
| KR | 20130113105 | A | 10/2013 |
| TW | 201428160 | A | 7/2014 |
| WO | 1997001691 | A2 | 1/1997 |
| WO | 2001059242 | A1 | 8/2001 |
| WO | 2010079247 | A1 | 7/2010 |
| WO | 2011160112 | A1 | 12/2011 |
| WO | 2012018986 | A1 | 2/2012 |
| WO | 2014127400 | A1 | 8/2014 |

OTHER PUBLICATIONS

U.S. Department of Homeland Security Active Shooter Booklet (2008): Active Shooter—How to Respond (dhs.gov).
Active Shooter Guidebook from California Emergency Management Agency (2007): calema-active-shooter-handbook.pdf.

(56) References Cited

OTHER PUBLICATIONS

Winkle, et al., "Active Shooters In Secondary Schools: The Unique Role of Physical Educators," Indiana AHPERD Journal: 15-18 (2009).
International Association for Healthcare Security and Safety (May 2011): IAHSS Emergency Management & Active Shooter.
University of Texas Medical Branch Institutional Handbook of Operating Procedures (2008): IHOP—Aug. 2, 2008—Active Shooter Response.pdf (utmb.edu).
Security Guidance for Commercial Buildings (2012): Security Guidance.
Chemical Facility Security Best Practices Guide for an Active Shooter Incident (2010): Best Practices Guide for an Active Shooter Incident.
Holy Cross College Safety Tips and Guidelines Responding to an Active Shooter on Campus (Jan. 2013): Safety Tips and Guidelines Responding to an Active Shooter on Campus.
Mass Shootings at Virginia Tech, Report of the Virginia Tech Review Panel Presented to Governor Kaine Commonwealth of Virginia (2007).
NYPD Active Shooter Recommendations and Analysis for Risk Mitigation (2012): ActiveShooter2012Edition.
Brevard Community College Security Department Operations Manual (2010): campussecurityoperationsmanual.pdf (easternflorida.edu).
Motzer, et a., "Active Shooter" Safety Guidelines for Healthcare Campuses (2010): Leading People Through Disasters (rochester.edu).
FEMA Active Shooter Course (2012): Active Shooter: What You Can Do.
Middle Georgia State University Guidance on How to Respond to an Active Shooter Situation (2011): Active Shooter Document.
Central Connecticut State University Emergency Procedures Guide (2007): EmergencyProceduresGuide.pdf (ccsu.edu).
Emergency Preparedness—Planning and Management (2010): Emergency Preparedness-Planning and Management—PMC (nih.gov).
School Safety: Tips to Prevent and Thwart Active Shooters, Artilce by Indiana Stat University (2007) (newswise.com).
City of Houston YouTube video (2012): Run. Hide. Fight. Surviving an Active Shooter Event.
Daily Standard News Article (Jan. 24, 2013): Practice Barricade.
Abramowitz, "Five OUTS, for Community Facing an On-Campus Active Shooter," Penn State Student Blog /2011).
True, "Police and Educators Train for School Shooter Situations," The Patriot Ledger (2013).
The Wayback Machine—https://web.archive.org/web/20120414022820/http://securmar.com:80/protection/barriers.html.
The Wayback Machine—https://web.archive.org/web/20120603082115/http://www.nabulletproof.com:80/Mobile_Ballistic_Podiums.php.
District of Columbia Homeland Security and Emergency Management Agency (2012).

* cited by examiner

PROTECTIVE CABINET

CROSS-REFERENCE TO RELATED APPLICATIONS

This application claims the benefit of U.S. Provisional Application No. 63/053,109 titled "Ballistic Resistant Cabinet," filed Jul. 17, 2020, which application is incorporated herein by reference in its entirety.

FIELD OF THE INVENTION

This invention relates generally to protective barriers, and more particularly to a cabinet that may be moved from a first position in use as a furniture item to a protective position blocking an ingress/egress point of a room.

BACKGROUND OF THE INVENTION

Violent crime has become far too pervasive in modern society. Incidents of gun violence, for instance, are noted with increasing frequency, including incidents of so call "mass shootings" in which someone equipped with a gun will target oftentimes wholly innocent victims for any of a wide variety of reasons. Public facilities are not infrequent targets of such mass shooting events, such as schools, churches, large workplaces, shops, community centers, and the like. While some wealthy individuals might protect their homes with, for example, safe rooms that might prevent a would-be shooter from harming them, such public facilities typically are simply not equipped (financially, from a space planning and infrastructure perspective, or otherwise) to provide safe rooms that would enable students, shoppers, or other visitors to be protected in the event of an active shooter scenario.

Thus, there is continuing if not growing need for tools capable of providing protection for members of the general civilian public in public places from such gun violence threats. However, providing devices capable of providing such protections in a form that would be easy to use by unarmed persons untrained in defending against gun violence are simply not widely available. It would therefore be advantageous to provide devices that could be used to protect a group of civilians, such as a group of students in a classroom, church members in a chapel, office workers in a conference room, or the like from attack by an armed assailant, that is sufficiently easy to use so that it can be employed without specialized training, and that preferably would not require significant changes to infrastructure (such as the creation of safe rooms or the like) to implement.

SUMMARY OF THE INVENTION

In accordance with certain aspects of an embodiment of the invention, disclosed herein is a protective cabinet in the form of a moveable furniture unit, such as a bookshelf, decorative shelf, or other upright cabinet, that has structure to enable moving the furniture unit into a locked position in which it blocks a point of ingress of a would-be assailant, such as a door or window into a classroom or other space populated by civilians. In certain configurations, the furniture unit includes protective, hardened material, such as a ballistic material such as, by way of non-limiting example, fiberglass, that provides increased protection against fire from a weapon, such as may be encountered in an active shooter event. For example, the cabinet may be used on a daily basis inside of a classroom, and may be moved and locked into a position in front of a doorway, window, or other ingress or egress point of the classroom during an active shooter or other threat event to both block the ingress/egress point and provide ballistic protection against weapons fire from outside of the room.

In a particular configuration, the cabinet may provide multiple levels of deterrence against an attack inside of a room, such as a classroom. In a first aspect, the overall cabinet structure provides a sizable physical barrier against unauthorized entry into the room. In another aspect, the back side of the cabinet (which faces the outside of the room that is being protected) may incorporate a psychological deterrent, such as a reflective surface or a calming message, which provides an added level of deterrence against an attack inside of the room. In yet another aspect, the interior cabinet structure incorporates the protective, hardened material, which provides yet another added level of deterrence against an attack inside of the room. In a particularly preferred configuration, the cabinet includes a locking mechanism that temporarily joins the cabinet to the walls of the structure surrounding a point of ingress or egress, such that the cabinet itself is not dependent upon the strength of the ingress/egress point itself (e.g., a door or window jam). Access to such locking mechanism may be enabled from outside of the protected space, but only via authorized access, such as with a key, an electronic keypad engaging an electronic lock, or the like. In accordance with certain aspects of an embodiment, the locking mechanism is particularly configured to position the lock that engages the surrounding structure behind a portion of ballistic material and away from and out of alignment with the keyed actuator for such lock, such that if an assailant were to fire their weapon to shoot through the keyed actuator, it would not strike the lock, and instead would only damage the actuator itself while leaving the cabinet locked against the wall. In accordance with further aspects of an embodiment, a bracket that holds the locking mechanism is affixed to the cabinet only at fixation points that are behind a central vertical wall in the cabinet, rendering it even more difficult for the would-be assailant to access, dislodge, or otherwise damage the locking mechanism.

In accordance with still further aspects of an embodiment, the cabinet has a width dimension that is larger than the perimeter of the door (or other ingress/egress point) such that the side walls of the cabinet are positioned outside of the door opening when the cabinet is locked in position. Likewise, the back face of the cabinet is recessed into the cabinet body. This configuration places the back edge of each sidewall flush against the wall inside of the room being protected with the cabinet positioned over any protruding door handles, in turn preventing a would-be shooter or assailant from either shooting through any gap that might otherwise result between the wall and the cabinet, or from using breaching mechanisms (e.g., crowbars of the like) to pry the cabinet away from the door opening.

In accordance with certain aspects of an embodiment of the invention, a protective cabinet defining a cabinet front side and a cabinet back side is provided, comprising a bottom wall extending from the front side of the cabinet to the back side of the cabinet, a top wall extending from the front side of the cabinet to the back side of the cabinet, side walls extending between each of the bottom wall and the top wall, an intermediate wall extending from the bottom wall to the top wall, wherein the intermediate wall is positioned between the front side and the back side of the cabinet, the intermediate wall having an intermediate wall front side facing the cabinet front side and an intermediate wall back side facing the cabinet back side, and the cabinet defining an open space between the intermediate wall back side and the cabinet back side, and a sheet of hardened ballistic material inside of the intermediate wall.

In accordance with further aspects of an embodiment of the invention, a protective cabinet defining a cabinet front side and a cabinet back side is provided, comprising a bottom wall extending from the front side of the cabinet to the back side of the cabinet, a top wall extending from the front side of the cabinet to the back side of the cabinet, side walls extending between each of the bottom wall and the top wall, an intermediate wall extending from the bottom wall to the top wall, wherein the intermediate wall is positioned between the front side and the back side of the cabinet, the intermediate wall having an intermediate wall front side facing the cabinet front side and an intermediate wall back side facing the cabinet back side, and the cabinet defining an open space between the intermediate wall back side and the cabinet back side, and a lock assembly having a first portion affixed to an outer face of at least one of the side walls and configured to engage a second portion of the lock assembly affixed to a wall adjacent a point of ingress into a room.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE FIGURES

The novel features of the invention are set forth with particularity in the appended claims. A better understanding of the features and advantages of the present invention will be obtained by reference to the following detailed description that sets forth illustrative embodiments, in which the principles of the invention are utilized. The present invention is illustrated by way of example, and not by way of limitation, in the figures of the accompanying drawings, in which like reference numerals refer to similar elements, and in which:

DETAILED DESCRIPTION OF THE PREFERRED EMBODIMENTS

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes"

and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Unless otherwise indicated, all dimensions shown in the attached drawings are exemplary only and should not be construed as limiting the scope of the invention to those specific dimensions.

Figure 2:
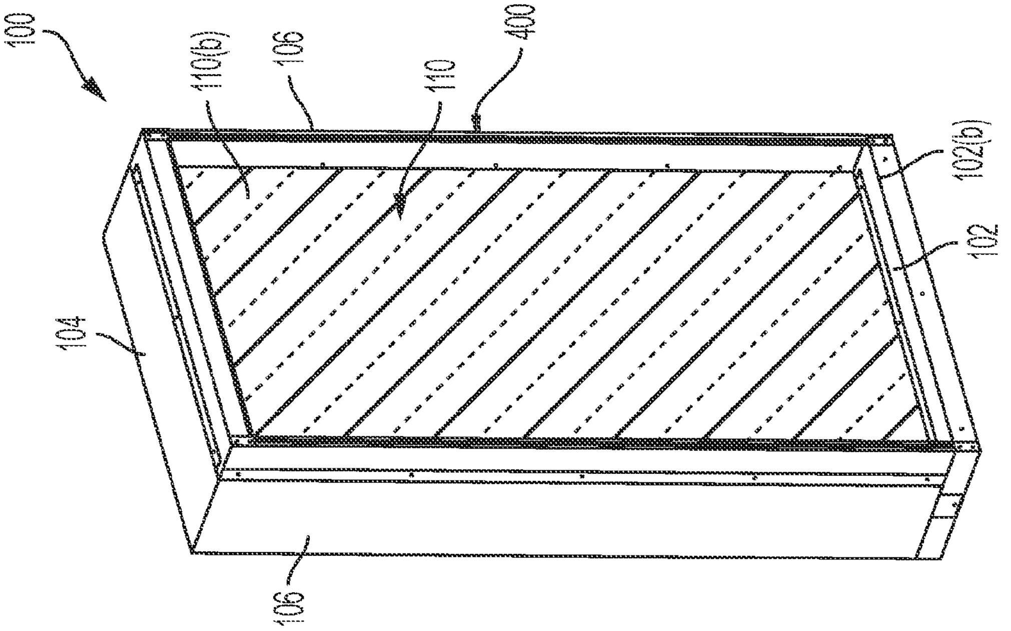
FIG. 2 is a rear perspective view of the protective cabinet of FIG. 1.
Figure 1:
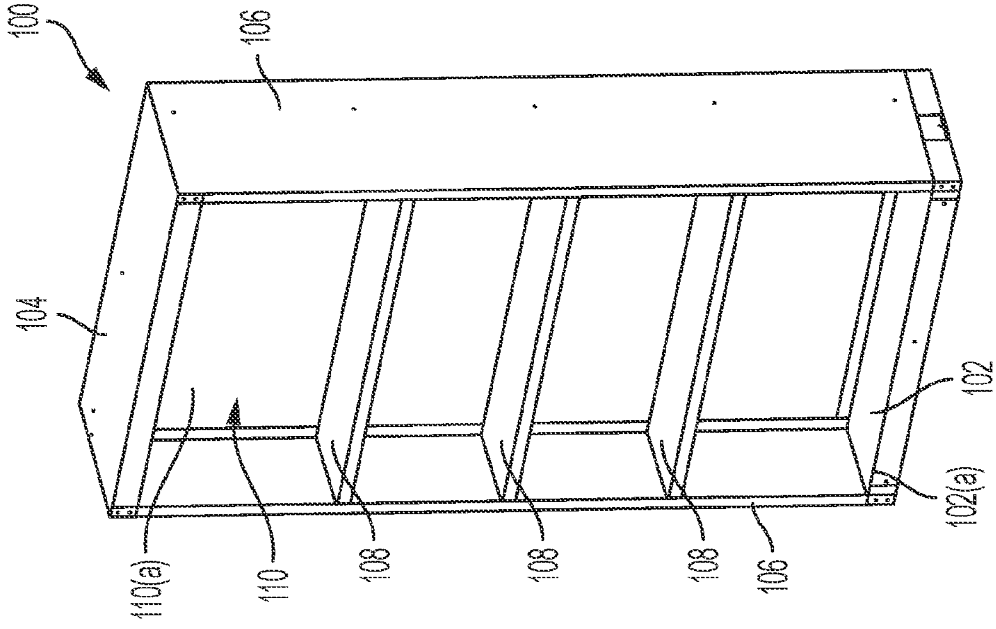
FIG. 1 is a front perspective view of a protective cabinet according to certain aspects of an embodiment of the invention.

FIG. 1 shows a front perspective view and FIG. 2 shows a rear perspective view of a cabinet 100, such as a bookshelf, in accordance with certain aspects of an embodiment of the invention. Cabinet 100 includes a bottom wall defining cabinet floor 102 extending from a front edge 102(*a*) facing the interior of the space that is to be protected, to a back edge 102(*b*) facing the point of ingress/egress of the space, such as a door, a window, or such other opening as will be apparent to those of ordinary skill in the art. Cabinet 100 likewise includes a cabinet top wall 104 and cabinet side walls 106. A plurality of preferably variably positionable shelves 108 may be provided and may rest on moveable pins positioned on the interior of cabinet side walls 106 in a traditional shelf-mounting configuration, such as when cabinet 100 is to serve as a bookcase. In certain configurations, shelves 108 may be attached to the interior of cabinet 100 via welding. In other configurations, shelves 108 may be slid into place and held on a shelf support, such as a peg extending outward from the interior side of each side wall 106. Those skilled in the art will readily recognize that the decorative or aesthetic aspects of the cabinet 100 may readily be modified to fit a particular environment, such as by providing decorative or ornate shelving and/or doors for use of cabinet 100 in private homes, or for use as (by way of non-limiting example) cubbies in elementary classrooms, or such other cabinet or large furniture item needs as will occur to those skilled in the art.

Cabinet 100 also includes an intermediate wall (shown generally at 110) having a front side 110(*a*) facing shelves 108 and serving as a back wall for those shelves 108, and having a back side 110(*b*) facing the point of ingress/egress of that space. Intermediate wall 110 extends upward from a position between front edge 102(*a*) and back edge 102(*b*) of cabinet floor 102, such that the back side 110(*b*) of intermediate wall 110 is inset from back edge 102(*b*). This configuration defines an open, generally rectangular space defined by back side 110(*b*) of intermediate wall 110, side walls 106 on either side, cabinet floor 102 on the bottom, and cabinet top 104 at the top. That open space allows cabinet 100 to be positioned directly in front of a door or other structure that may include a handle (with the handle extending into such open space defined on the back side of the cabinet), thus still allowing the rear perimeter of cabinet 100 to sit flush against the wall, and more particularly with side walls 106 positioned outside of a frame (e.g., a door frame) of the point of ingress/egress, and with top wall 104 positioned above the frame, thus exposing only the interior of open space on the back side of the cabinet to the point of ingress/egress, and thus to any potential assailant. Such configuration may be helpful in preventing a would-be shooter or assailant from either shooting through any gap that might otherwise result between the wall of the cabinet, or from using breaching mechanisms (e.g., crowbars or the like) to pry the cabinet away from the door opening. Preferably and as discussed in greater detail below, the back side 110(*b*) of intermediate wall 110 includes a reflective surface, such as a mirrored surface, a reflective paint, a message or image configured to dissuade violence, or the like, as discussed in greater detail below.

Next and with reference to FIGS. 3-8, intermediate wall 110 of cabinet 100 includes a hardened panel frame (shown generally at 200) that extends around the interior perimeter of cabinet 100, which in accordance with certain aspects of an embodiment of the invention and as discussed in further detail below is configured to hold a sheet of hardened, protective material, such as ballistic material that is capable of stopping weapons fire. In an exemplary embodiment, such hardened, protective material may comprise fiberglass, although other ballistic or bullet-proofing materials may likewise be used, such as KEVLAR or similarly configured materials. Hardened panel frame 200 includes a hardened panel top frame member 202 (shown in FIGS. 3 and 4 and removed in FIGS. 5 and 6) that is affixed to the underside of cabinet top 104, hardened panel side frame members 204 that are each affixed to the interior face of cabinet side walls 106, and hardened panel bottom frame member 206 affixed to the top face of cabinet floor 102. Hardened panel frame 200 creates a first gap (shown general at 220 in FIGS. 7 and 8) between such hardened panel frame 200 and the back face of intermediate wall 110. The back face of intermediate wall 110 is formed by a back cabinet panel 113 having a first back cabinet panel face 113(*a*) extending across nearly the entire width of cabinet 100, and side back panel faces 113(*b*) extending from first panel face 113(*a*) towards the back edge of the cabinet 100. With this configuration, a sheet of hardened protective material 300 may be inserted into gap 220 between hardened panel frame 200 and first back cabinet panel face 113(*a*). Similarly, side back panel faces 113(*b*) form a gap (shown generally at 222) between side back panel faces 113(*b*) and the interior face of cabinet side wall 106, which gap 222 may likewise receive a sheet of hardened protective material 300.

Figure 6:
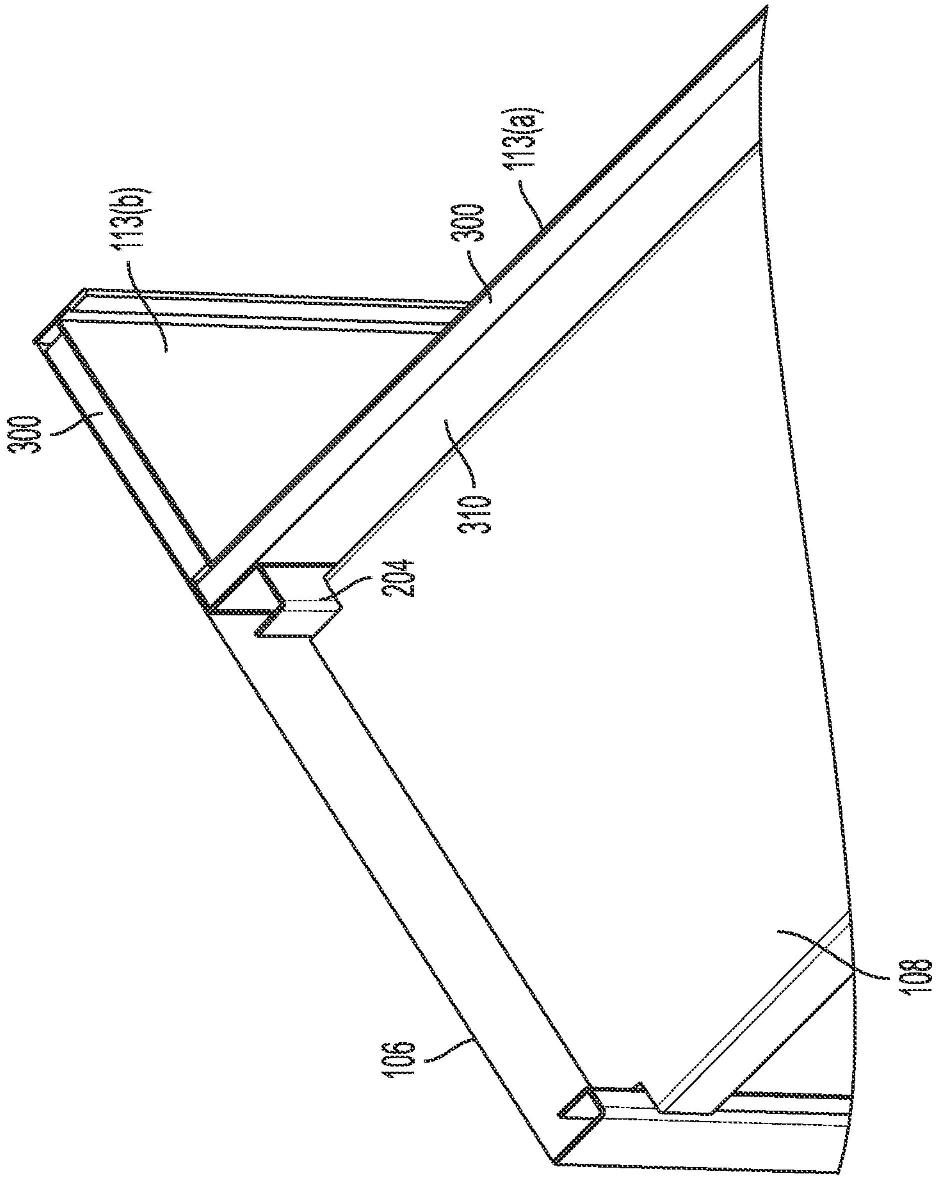
FIG. 6 is a top perspective section view of the protective cabinet of FIG. 1 showing hardened panels installed in the cabinet.
Figure 7:
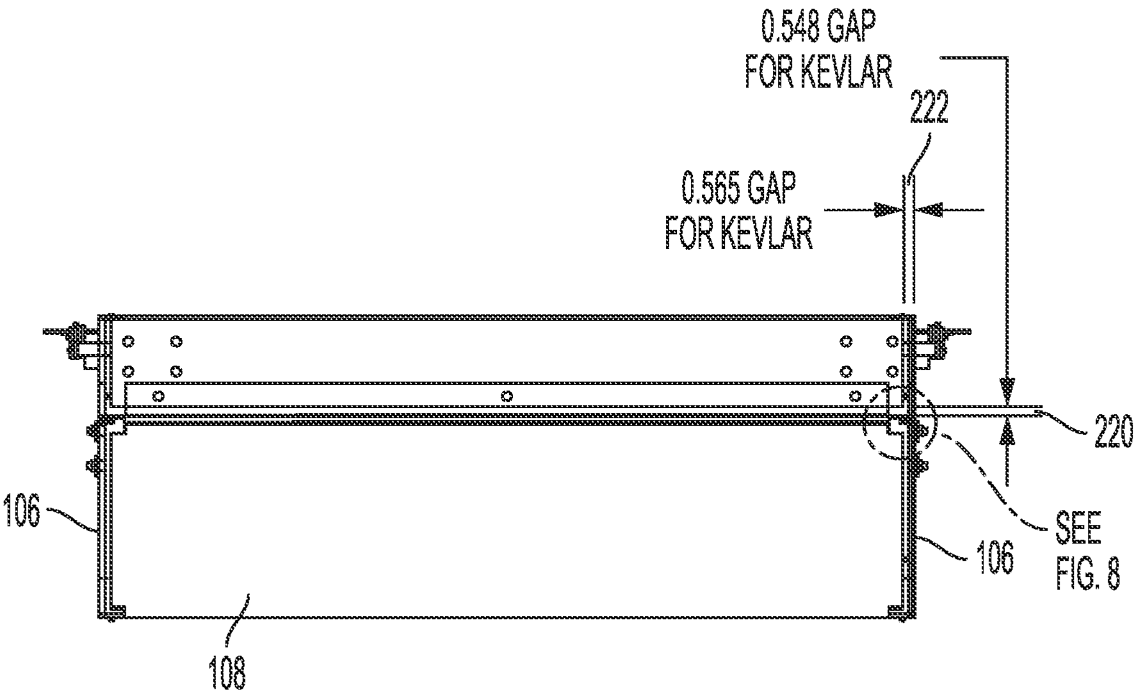
FIG. 7 is a top section view the protective cabinet of FIG. 1 from above a shelf of the protective cabinet.
Figure 8:
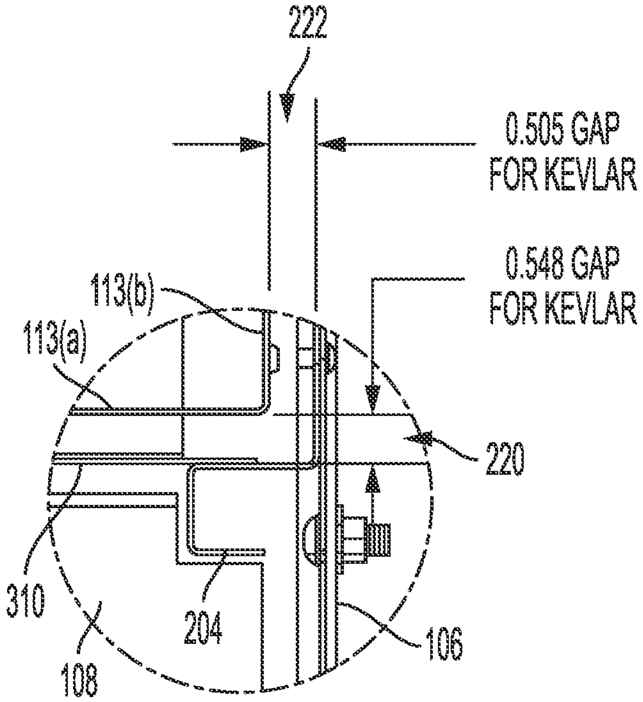
FIG. 8 is a close-up top section view of view C of FIG. 7.

In accordance with certain aspects of an embodiment, and with particular reference to FIG. 6, sheets of protective material 300 may be inserted, accessed (e.g., for servicing), and removed from cabinet 100 through removal of cabinet top 104 from the rest of cabinet 100, thus allowing access to the gaps 220 and 222. Further, the portion of protective material 300 that faces the front of cabinet 100 may itself optionally be covered with a sheet of cover material 310, such as sheet metal, decorative fabric, or any other material, or may itself be painted to match the appearance of the front portion of cabinet 100.

Figure 3:
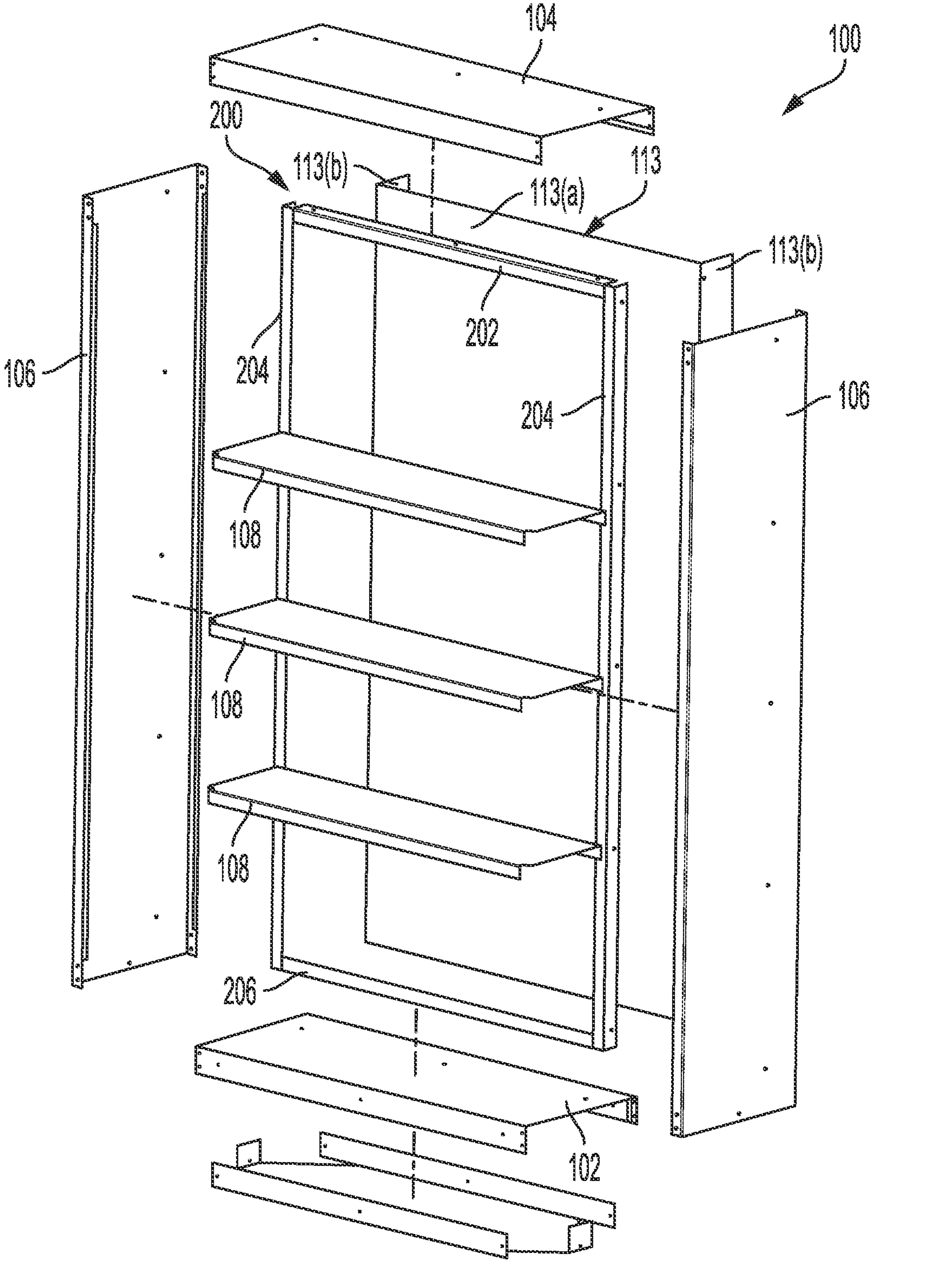
FIG. 3 is an exploded view of the protective cabinet of FIG. 1.
Figure 4:
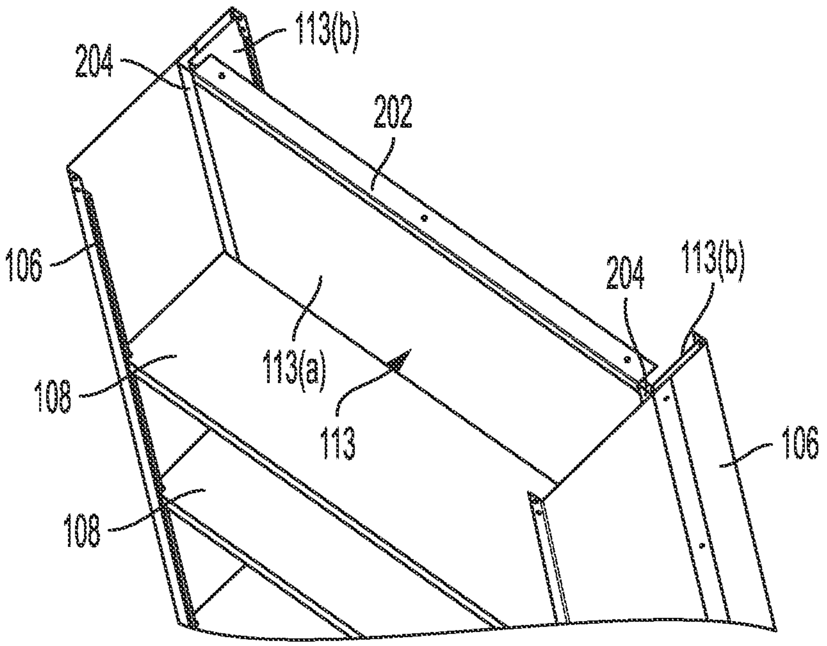
FIG. 4 is a top perspective section view of the protective cabinet of FIG. 1.

As best viewed in FIG. 3, a bottom panel 103 is optionally provided at the bottom exterior of cabinet 100, and forms an open space between the flat, planar portion of bottom panel 103 and the flat, planar portion of cabinet floor 102. Wheel assemblies (not shown), such as omni-directional wheels or casters, the construction of which are well known to those of ordinary skill in the art and thus are not further detailed here, are mounted within the open space between bottom panel 103 and cabinet floor 102. Bottom panel 103 preferably includes corner cutouts 103(*a*) that allow such wheels to engage the floor while still allowing the bottom-most edge of cabinet 100 to remain immediately adjacent to the floor. While it is important that protective cabinet 100 be movable from a first position in which it is usable as a furniture item, such as a bookcase, to a protective position blocking a point of ingress/egress, those skilled in the art will recognize that other mechanisms for rendering cabinet 100 moveable from place to place, such as by way of non-limiting example a rail system, may similarly be implemented without departing from the spirit and scope of the invention.

Figure 5:
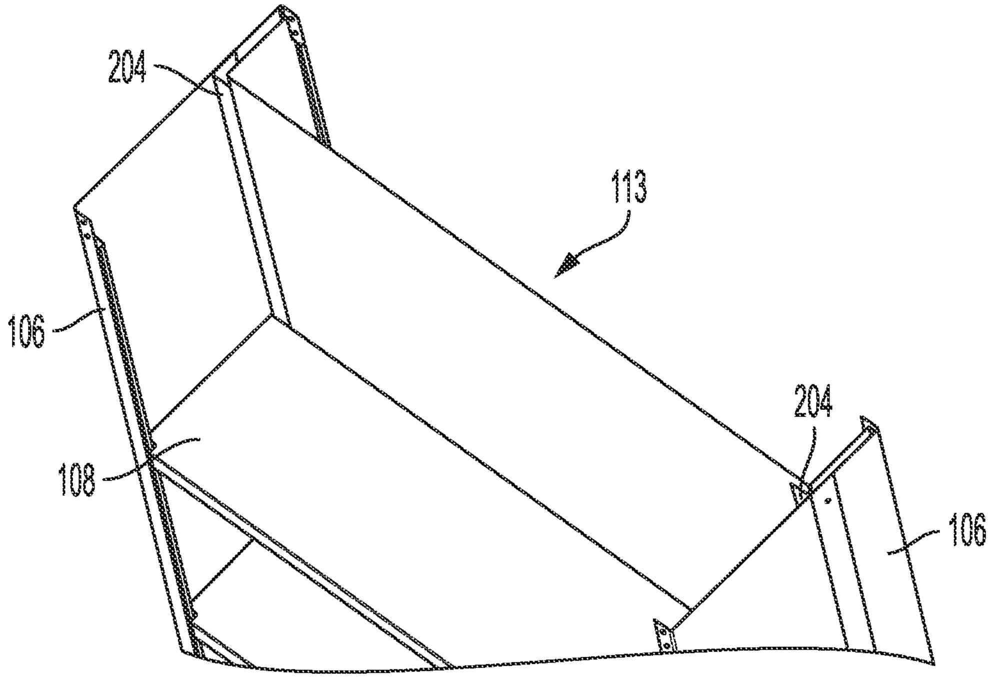
FIG. 5 is a top perspective section view of the protective cabinet of FIG. 1 with a top member of a hardened panel frame removed for clarity.
Figure 9:
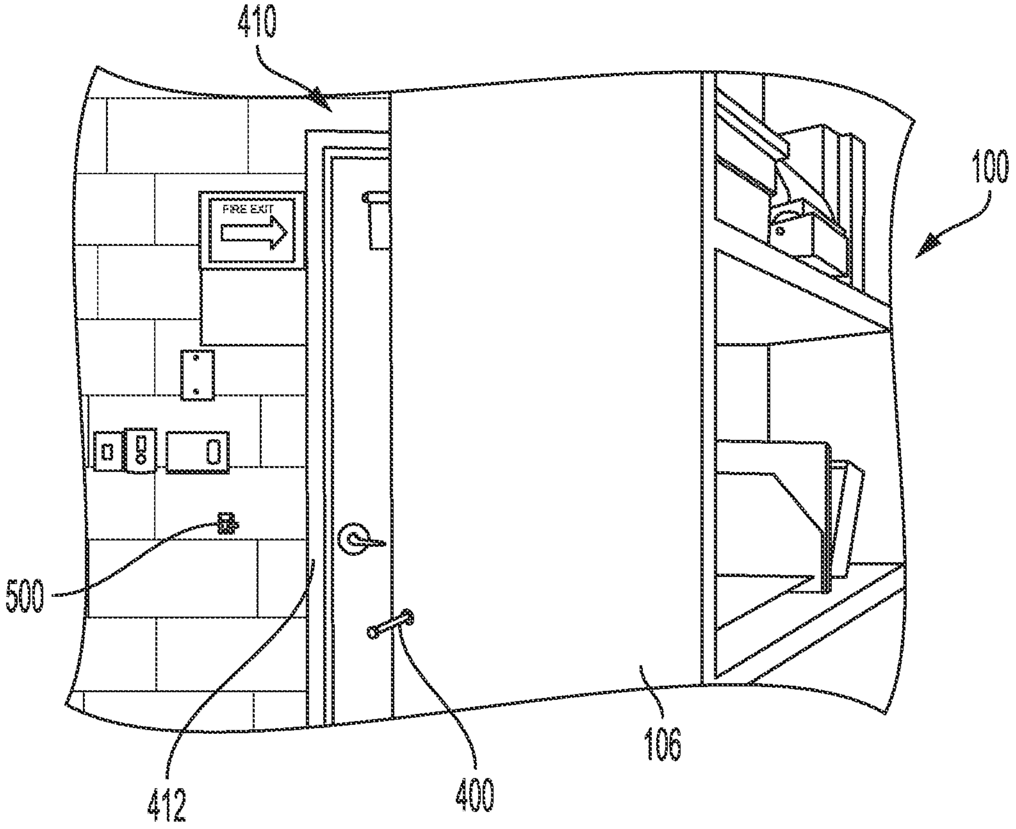
FIG. 9 is a side perspective view of the protective cabinet of FIG. 1 and including a locking mechanism for locking the protective cabinet in front of a point of ingress/egress of a protected space.
Figure 10:
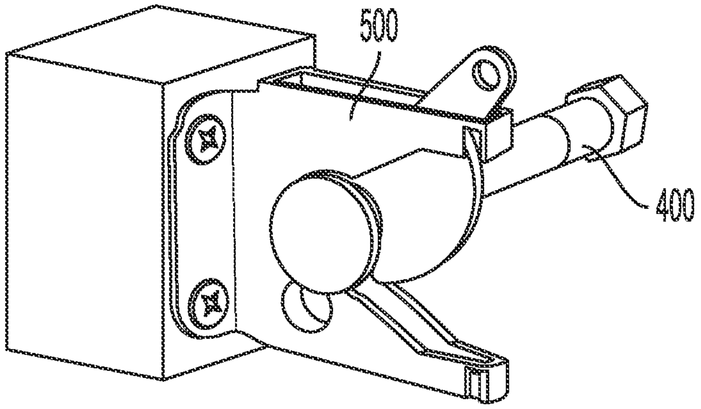
FIG. 10 is a close-up side perspective view of the locking mechanism of FIG. 9 in an engaged and locked position.

Next, and with reference to FIGS. 9 and 10, cabinet 100 preferably includes a locking mechanism for locking the cabinet 100 in a fixed position to block the point of ingress or egress into the space that is to be protected. In accordance with an exemplary configuration, such a locking mechanism may include latch arms 400 that are affixed to and extend horizontally outward from each side wall 106 of cabinet 100. A latch 500 that is configured to removably receive latch arm 400 may likewise be affixed to a wall surface immediately adjacent the ingress/egress point of the room that is to be blocked with cabinet 100. For example, if it is intended to use cabinet 100 to block a door entrance 410 into a room, latches 500 may be provided on opposite sides of the vertical portions of the door jamb 412. Such latches are configured to hold cabinet 100 in place blocking the ingress/egress point, and are positioned outside of the perimeter of the door jamb 412 so that the structure holding the cabinet 100 in place is not dependent upon the strength of the door jamb 412 or other frame of the ingress/egress point. While latch 500 as shown in FIG. 5 is in the form of a simple latch as may be found on a gate, those of ordinary skill in the art will recognize that other temporary latching assemblies may likewise be implemented to removably hold latch arms 400 without departing from the spirit and scope of the invention. For example, latch 500 may comprise an electronic or magnetic latch that may optionally be remotely operated from outside of the room in which cabinet 100 is located in order to allow an authorized person outside of the room (e.g., other school personnel, first responders, etc.) to gain access if necessary.

Figure 11:
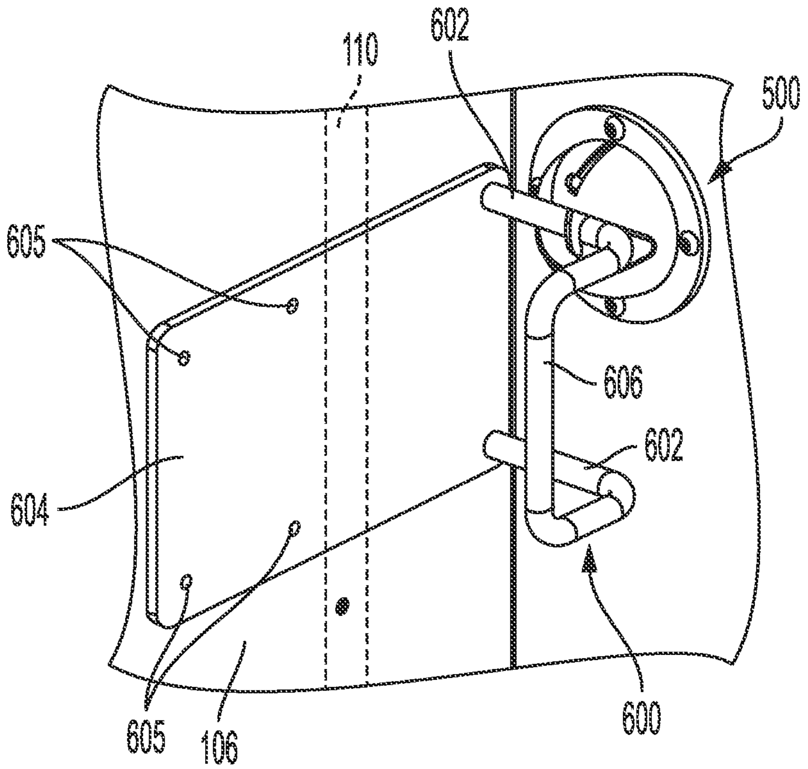
FIG. 11 is a side perspective view of a locking mechanism for use with the cabinet of FIG. 1 according to further aspects of an embodiment of the invention.
Figure 12:
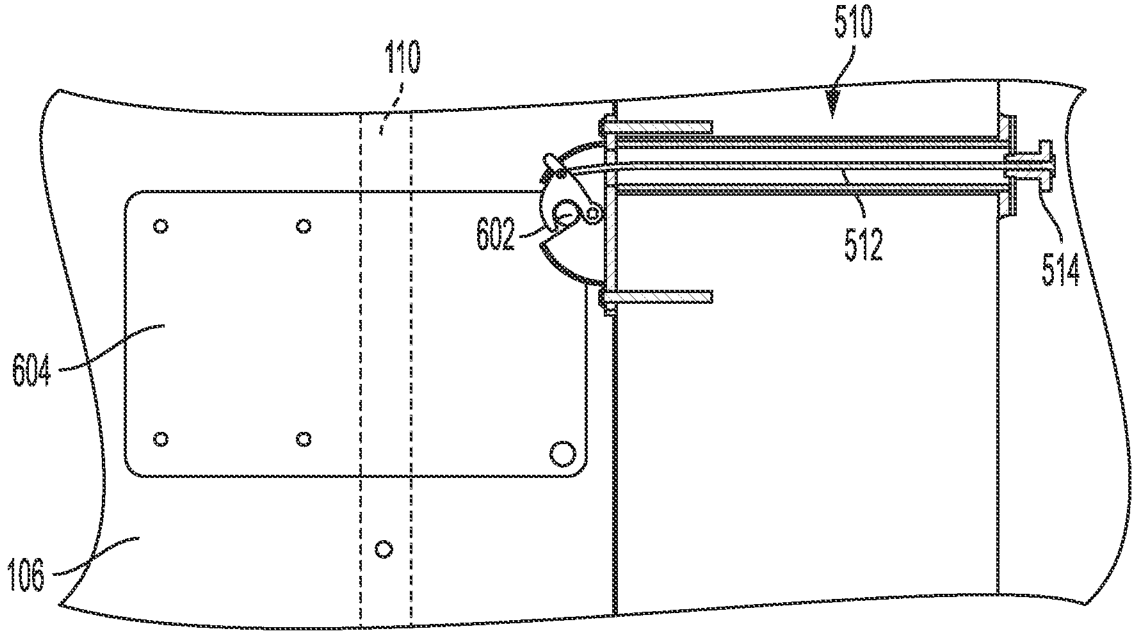
FIG. 12 is a side view of the locking mechanism of FIG. 11 including a sectional view of a wall housing a portion of the locking mechanism.

In another exemplary configuration and with particular reference to FIGS. 11 and 12, a handle 600 may be rigidly affixed to each side wall 106 of cabinet 100, which handle may both aid a user in moving cabinet 100 from place to place, and may serve as the locking arm that engages latch 500. More particularly, handle 600 may include horizontal arms 602 that extend horizontally outward from a plate 604 that is affixed to each side wall 106 of cabinet 100. A vertical arm 606 extends between horizontal arms 602 and serves as a grip to aid in manipulating cabinet 100 into the desired position. The upper horizontal arm 602 is positioned to align with latch 500 such that as the top horizontal arm 602 is pushed into latch 500, it automatically engages and becomes locked into latch 500 until latch 500 is intentionally opened. Such placement and ease of operation will aid in rapid placement of cabinet 100 over the point of ingress/egress that is to be protected, even in a high stress situation. In accordance with certain aspects of an embodiment of the invention, plate 604 is affixed to side wall 106 via fasteners (not shown) at connection points 605, such as by way of example via bolts or screws, that extend through plate 604 and into side wall 106 at a location that is forward of intermediate wall 110 (shown in phantom in FIGS. 11 and 12). As a result, access to the mounting assembly for handle 600 may be protected even from gun fire from an assailant on the opposite side of protective cabinet 100 by hardened barrier material 300 positioned within intermediate wall 110.

With continued reference to FIGS. 11 and 12, latch 500 may also include a rounded outer shell and a low profile extending outward from the wall on which latch 500 is mounted. Such rounded configuration of the outer shell, and the generally small profile, help to ensure the safety of individuals inside of the room that might accidentally fall into or rub against the latch 500 during everyday movement around the room.

With particular reference to FIG. 12, latch 500 may include an actuator (shown generally at 510) that extends through the wall to which latch 500 is attached, thus allowing operation by a person outside of the room. More particularly, latch 500 may be attached to an actuator rod 512 that extends through the wall to which latch 500 is attached and out through the opposite side of the wall, where it attaches to an actuator handle 514 that may be accessed on that exterior side of the wall. Optionally, actuator handle 514 may be disguised or hidden, or require controlled (e.g., keyed) access, to ensure that only authorized persons are able to access actuator handle 514 and thus unlatch cabinet 100 from its locked position blocking the point of ingress/egress that is to be protected.

As noted above, the rear-facing side of intermediate wall 110 preferably includes a psychological deterrent facing outward from the back side of the protective cabinet, which psychological deterrent is configured to at least temporarily deter an assailant from attempting to attack through the protective cabinet. In an exemplary configuration, such psychological deterrent may comprise a reflective surface, such as a mirrored surface, a reflective paint, or the like. Thus, when cabinet 100 is positioned to block an ingress/egress point into a room, the reflective surface faces such ingress/egress point. In that position, the reflective surface on rear-facing side of intermediate wall 110 provides a psychological deterrent to an assailant that is attempting to enter a room. More particularly, as an assailant arrives at the ingress/egress point of the room, such as a doorway, they are forced to see themselves in real time. It is believed that when faced with their own reflection, an assailant will typically at least temporarily pause in a moment of reflection. Such a delay in action on the part of the assailant may provide first responders additional time to engage the assailant. To provide such a psychological deterrent, the reflective surface may be configured in a variety of ways, including by way of non-limiting example by providing a mirror attached to the rear-facing side, forming the rear-facing side of mirror material, providing a reflective glass on the rear-facing side, painting the rear-facing side with a high gloss paint, forming the rear-facing side of high gloss steel, or any other manner as will occur to those skilled in the art for creating a reflection of someone standing adjacent to the rear-facing side of intermediate wall 110. Additionally or even in place of a reflective surface, the rear-facing side of intermediate wall 110 may include messaging, such as statements, posters, signs or the like that include positive messages that a would-be assailant will view when standing adjacent to the rear-facing side of intermediate wall 110.

Figure 13:
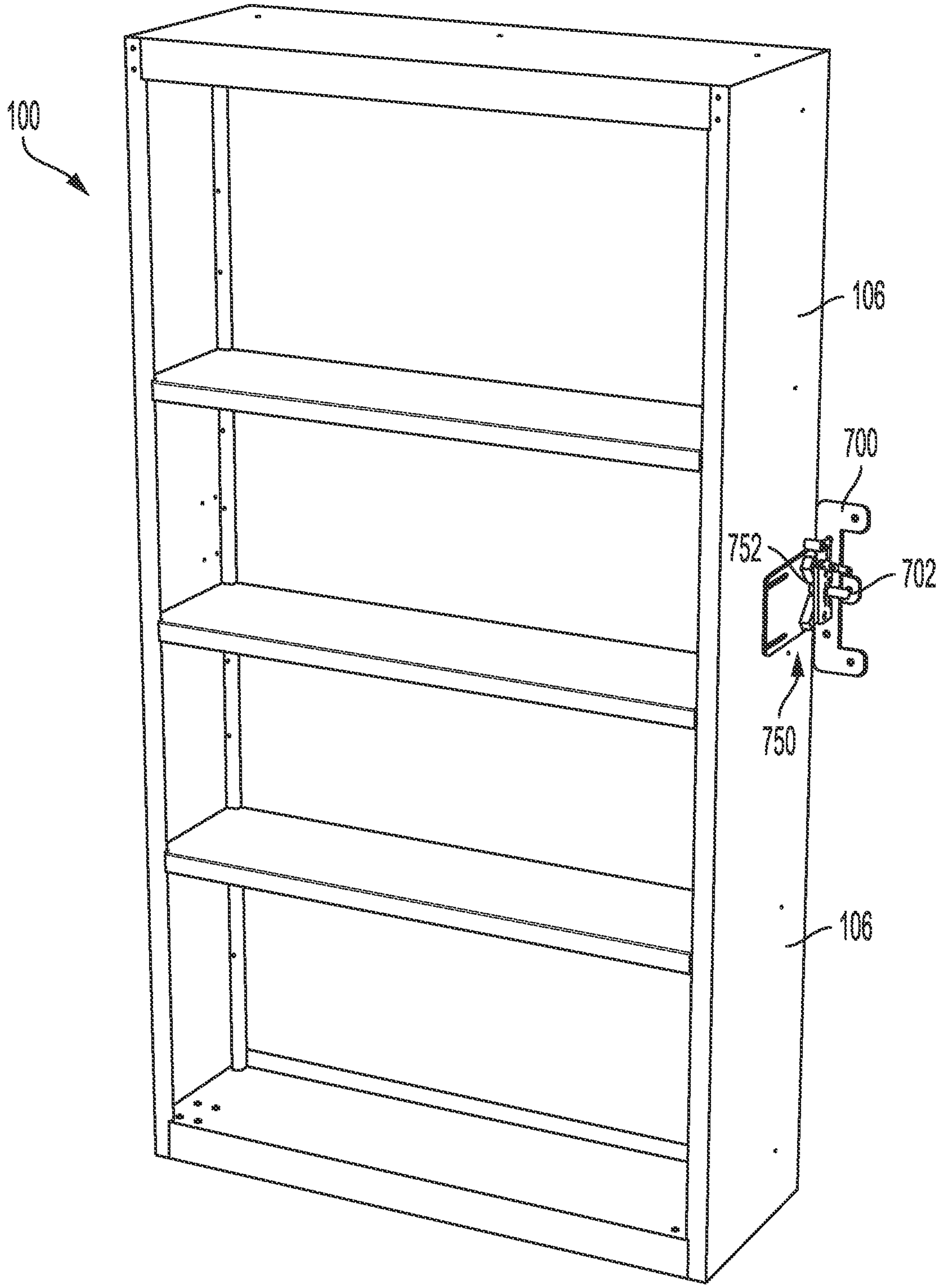
FIG. 13 is a front perspective view of the protective cabinet of FIG. 1 having a locking mechanism according to still further aspects of an embodiment of the invention.
Figure 14:
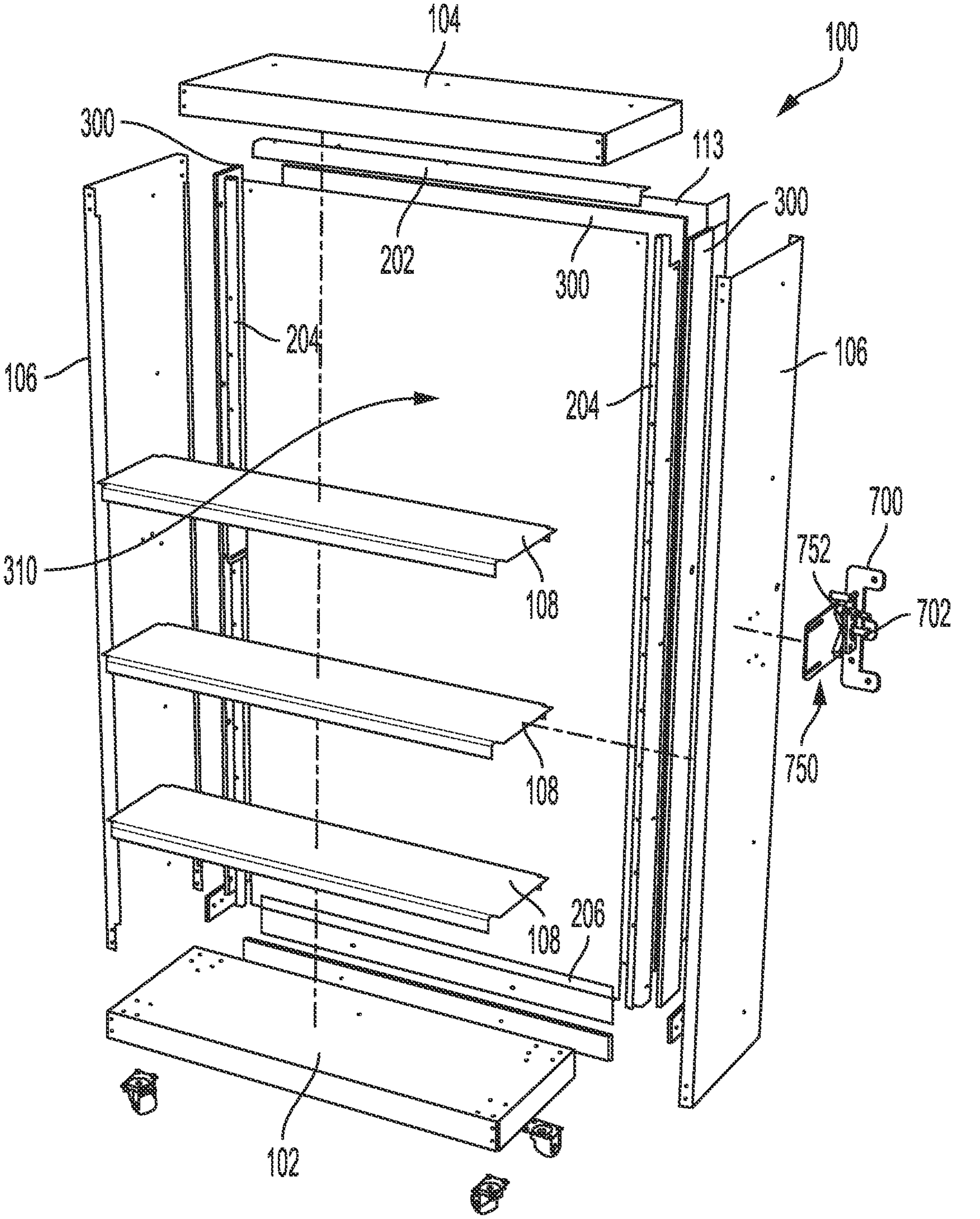
FIG. 14 is an exploded view of the protective cabinet of FIG. 13.
Figure 15:
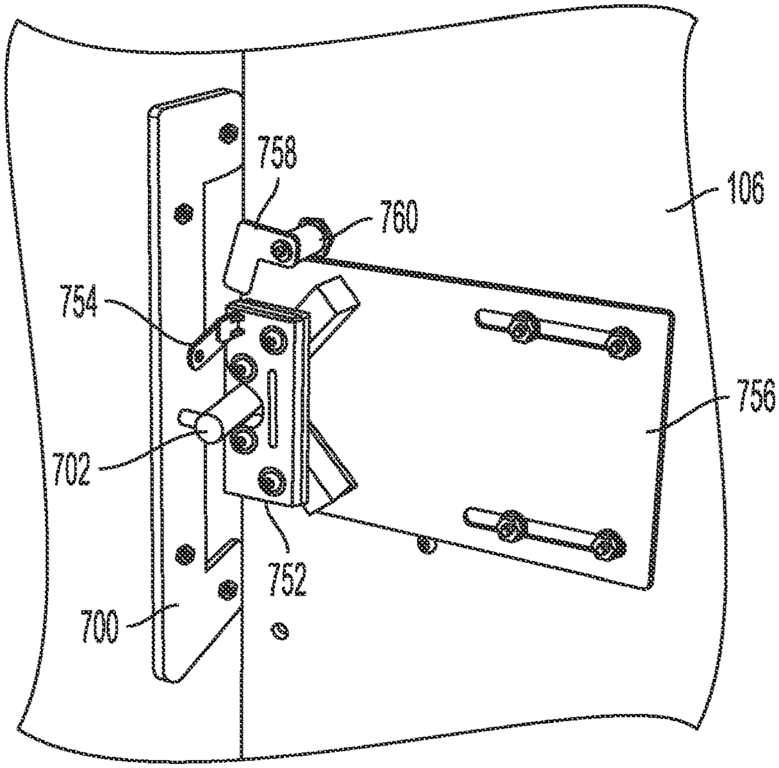
FIG. 15 is a side perspective view of the locking mechanism employed in FIG. 13 and showing a keyed actuator in a disengaged position with the lock fully engaged.
Figure 16:
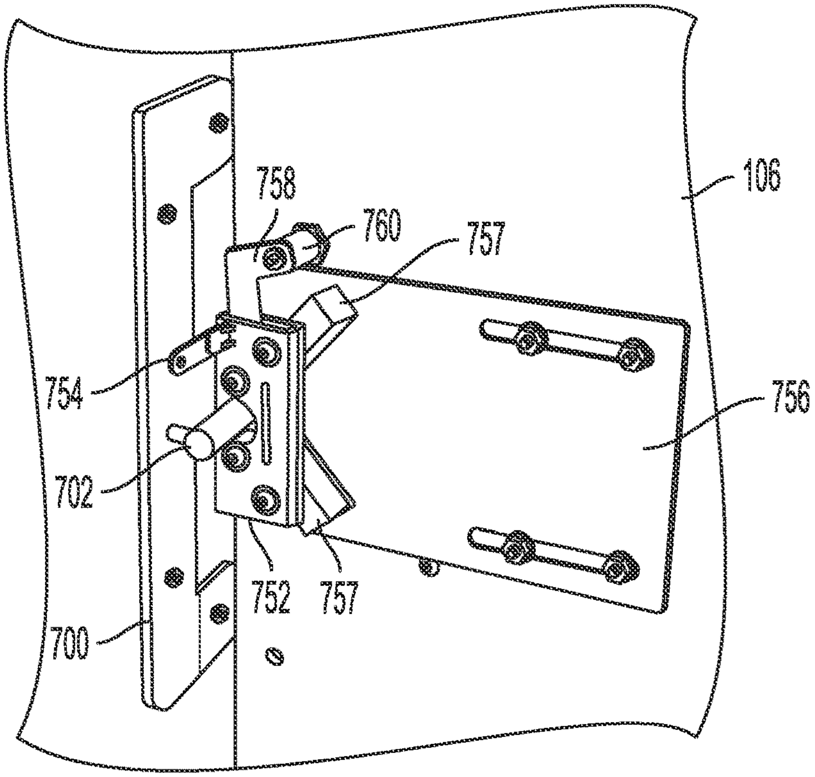
FIG. 16 is a side perspective view of the locking mechanism employed in FIG. 13 and showing the keyed actuator in an engaged position with the lock released to enable movement of the protective cabinet away from the point of ingress/egress.

Next, FIG. 13 provides a front perspective view, and FIG. 14 an exploded view, of protective cabinet 100 in accordance with still further aspects of an embodiment of the invention. As shown in FIGS. 13 and 14, the locking mechanism may comprise a bracket 700 that may be affixed to the wall adjacent to the ingress/egress opening that is to be blocked by protective cabinet 100, with a latch assembly (shown generally at 750) rigidly mounted to side wall 106 of cabinet 100. Bracket 700 includes a locking bar 702 that engages latch lock 752 on latch assembly 750, such that when latch bar 702 is pushed into latch lock 752, latch bar 702 becomes locked inside of latch lock 752 until a release bar 754 is manually engaged to mechanically release latch lock 752. Preferably and with particular reference to FIGS. 15 and 16, a key-actuated release bar actuator 758 is positioned to engage release bar 754 when a key is inserted into key lock assembly 760 and turned, thus providing an additional means of releasing locking bar 702 from latch lock 752. The key hole of key lock assembly 760 may be mounted on the interior of side back panel face 113(*b*) to enable keyed access to authorized persons. Thus when an authorized person uses such a key to turn key-actuated release bar actuator 758, release bar actuator 758 engages release bar 754, in turn causing release bar 754 to mechanically release latch lock 752.

Figure 17:
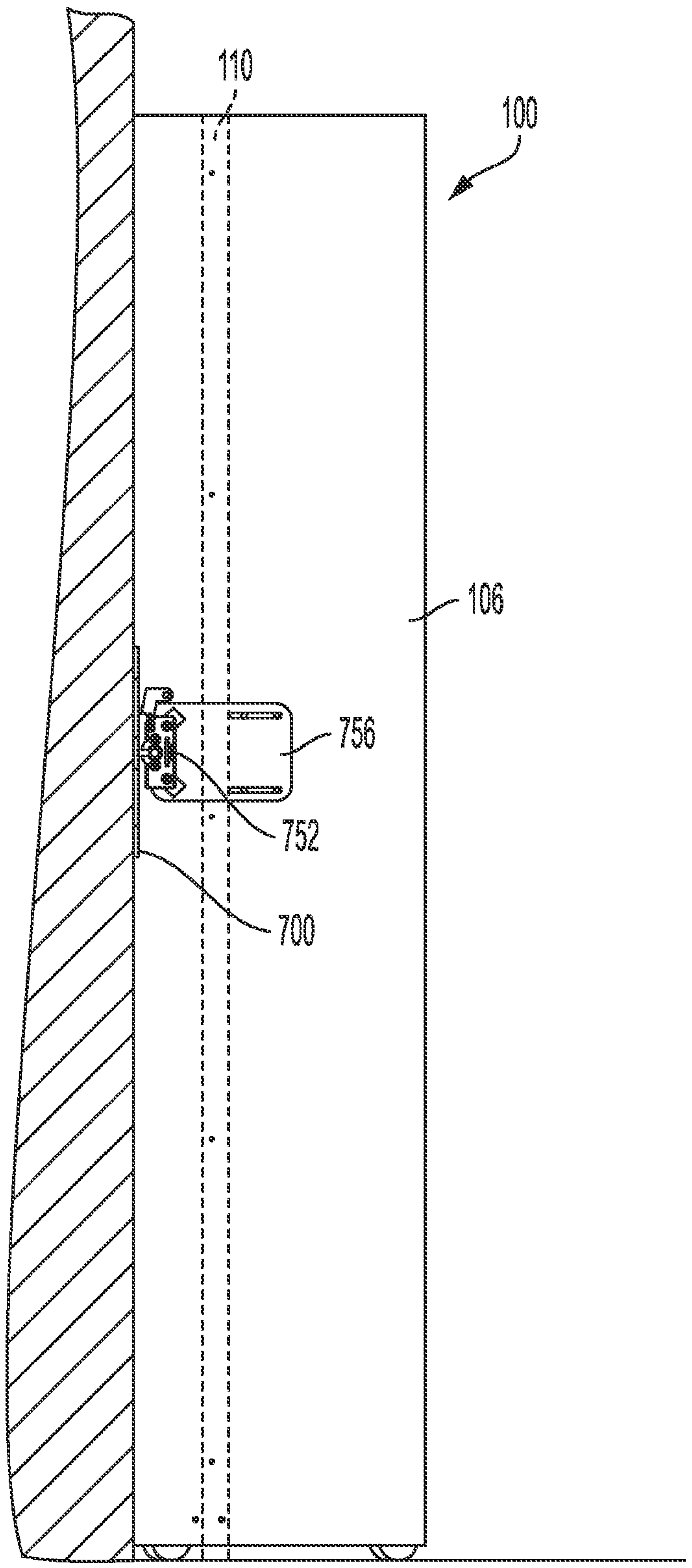
FIG. 17 is a side view of the engaged locking mechanism of FIG. 13 on the protective cabinet.

The internal assemblies of such latch lock assemblies are well known to those skilled in the art, and thus are not further detailed here. However, the position of latch lock 752 on mounting bracket 756, and its position with respect to key lock assembly 760, provide additional important security features. More particularly and with reference to FIG. 17, mounting bracket 756 is first mounted to side wall 106 of protective cabinet 100 at a position that is forward of intermediate wall 110, which as discussed above further protects the mounting assembly of latch assembly 750 from being accessed or damaged, even by gun fire, by an assailant on the opposite side of protective cabinet 100. Further, mounting bracket 756 includes mounting blocks 757 (FIGS. 15 and 16) that in a preferred configuration are formed of a rigid material, such as steel, that are welded to and thus permanently affixed to mounting bracket 756. Mounting blocks 757 not only serve to mount latch lock 752, but likewise are positioned between the internal locking mechanism of latch lock 752 and multiple layers of protection—namely, mounting bracket 756 itself, side wall 106, and any layer of protective material 300 that is positioned between side wall 106 and side back panel face 113(*b*) of back cabinet panel 113—to further protect the internal locking mechanism of latch lock 752 from damage or disablement from an assailant on the opposite side of protective cabinet 100. Even further, to any extent that key lock assembly 760 might provide a potential point of weakness (e.g., if an assailant were to fire their weapon directly into key lock assembly 760), as it is out of alignment with the entirety of latch assembly 750 (including bracket 756), the structural integrity of the latch assembly will be maintained. Thus, even complete destruction of such key lock assembly will not enable an intruder to overcome the lock assembly to move protective cabinet away from the point of ingress/egress.

Figure 18:
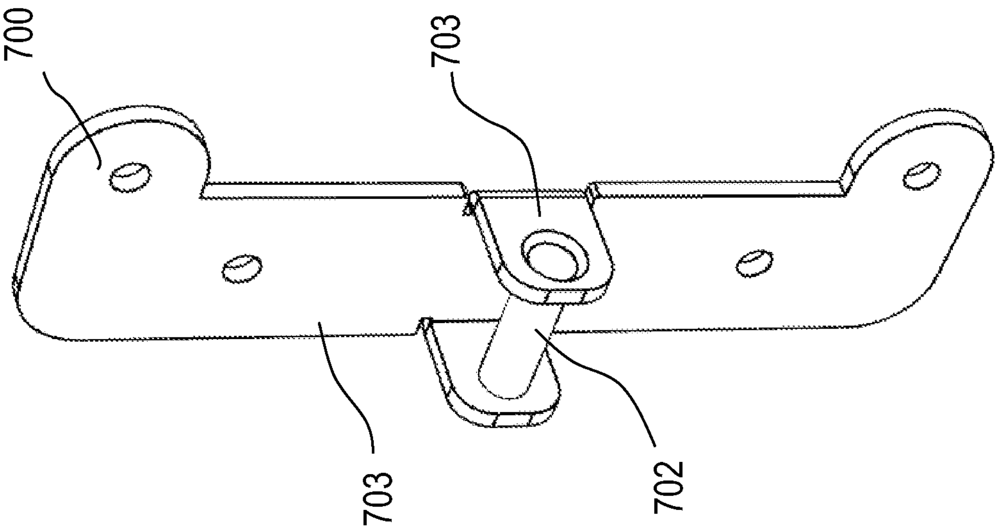
FIG. 18 is a perspective view of a bracket of the locking system of FIG. 13 in accordance with further aspects of an embodiment of the invention.

Optionally in exemplary configurations and with particular reference to the close-up view of bracket 700 of FIG. 18, locking bar 702 may be mounted to flanges 703 that extend outward from the face of bracket 700 and hold locking bar 702 at opposite ends of locking bar 702. Flanges 703 are thus positioned with respect to locking bar 702 to further aid in protecting locking bar 702 against ballistic attack, such as from the sides of bracket 700.

Figure 19:
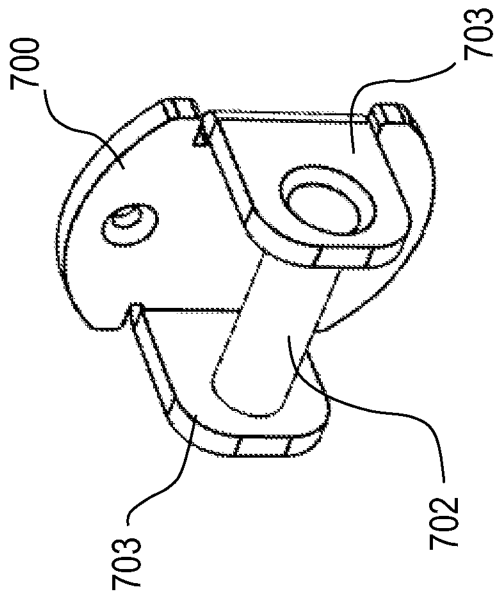
FIG. 19 is a perspective view of a bracket of the locking system of FIG. 13 in accordance with still further aspects of an embodiment of the invention.

Optionally in exemplary configurations and with particular reference to FIG. 19, similarly configured brackets having at least a similarly configured locking bar 702 (and optionally flanges 703) may be attached to a fixed structure, such as a classroom wall, away from the point of ingress/egress and simply to provide an anti-tipping safety device when cabinet 100 is used in such room as a furniture item, such as a bookcase. In those positions, bracket 700 may have a smaller profile than when used for anchoring cabinet 100 next to a point of egress.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A protective cabinet defining a cabinet front side and a cabinet back side, comprising:
- a bottom wall extending from said front side of said cabinet to said back side of said cabinet;
- a top wall extending from said front side of said cabinet to said back side of said cabinet;
- side walls extending between each of said bottom wall and said top wall;
- an intermediate wall extending from said bottom wall to said top wall, wherein said intermediate wall is positioned between said front side and said back side of said cabinet, said intermediate wall having an intermediate wall front side facing said cabinet front side and an intermediate wall back side facing said cabinet back side, and said cabinet defining an open space between said intermediate wall back side and said cabinet back side;
- a back cabinet panel having a first back panel face forming a back side of said intermediate wall and at least one side back panel face extending from said first back cabinet panel face to said cabinet back side;
- a sheet of hardened ballistic material inside of said intermediate wall; and
- a lock assembly having a first portion affixed to an outer face of at least one of the side walls at substantially a midpoint between the top wall and bottom wall and configured to engage a second portion of said lock assembly affixed to a wall adjacent a point of ingress into a room;
- wherein the lock assembly comprises a key lock assembly, a key-actuated release bar actuator operatively attached to said key lock assembly, and a key hole mounted on the side back panel face to enable keyed access from the intermediate wall back side.

2. The protective cabinet of claim 1, said intermediate wall further comprising a hardened ballistic material frame forming a front perimeter of said intermediate wall.

3. The protective cabinet of claim 2, said hardened ballistic material frame further comprising a top frame member affixed to an underside of said top wall, a bottom frame member affixed to a top side of said bottom wall, and a side frame member attached to an interior side of each of said side walls.

4. The protective cabinet of claim 2, further comprising a panel of cover material affixed to a front side of said hardened ballistic material frame.

5. The protective cabinet of claim 1, further comprising a second sheet of hardened ballistic material between said side back panel face and said cabinet side wall.

6. The protective cabinet of claim 1, wherein said cabinet further comprises wheels extending below said bottom wall of said cabinet.

7. The protective cabinet of claim 1, said intermediate wall back side further comprising a visual psychological deterrent facing said cabinet back side comprising one or more of a reflective surface and positive or calming messaging.

8. The protective cabinet of claim 7, wherein said visual psychological deterrent further comprises a mirrored surface on said intermediate wall back side.

9. The protective cabinet of claim 1, further comprising a plurality of shelves positioned between said intermediate wall and said cabinet front side.

10. The protective cabinet of claim 1, further comprising a lock assembly having a first portion affixed to an outer face of at least one of the side walls and configured to engage a second portion of said lock assembly affixed to a wall adjacent a point of ingress into a room.

11. A protective cabinet defining a cabinet front side and a cabinet back side, comprising:

a bottom wall extending from said front side of said cabinet to said back side of said cabinet;

a top wall extending from said front side of said cabinet to said back side of said cabinet;

side walls extending between each of said bottom wall and said top wall;

an intermediate wall extending from said bottom wall to said top wall, wherein said intermediate wall is positioned between said front side and said back side of said cabinet, said intermediate wall having an intermediate wall front side facing said cabinet front side and an intermediate wall back side facing said cabinet back side, and said cabinet defining an open space between said intermediate wall back side and said cabinet back side; and a lock assembly having a first portion affixed to an outer face of at least one of the side walls at substantially a midpoint between the top wall and bottom wall and configured to engage a second portion of said lock assembly affixed to a wall adjacent a point of ingress into a room;

said intermediate wall back side further comprising a visual psychological deterrent facing said cabinet back side comprising one or more of a reflective surface and positive or calming messaging.

12. The protective cabinet of claim 1, wherein said first portion of said lock assembly further comprises a latch lock, and said second portion of said lock assembly further comprises a locking bar rigidly affixed to a wall.

13. The protective cabinet of claim 12, wherein said first portion of said lock assembly further comprises a mounting bracket affixed to at least one of said side walls at attachment points between said intermediate wall and said cabinet front side.

14. The protective cabinet of claim 13, said mounting bracket further comprising at least one mounting block, wherein said latch lock is mounted to said at least one mounting block.

15. The protective cabinet of claim 14, wherein said mounting block is positioned in alignment with a locking mechanism of said latch lock.

16. The protective cabinet of claim 13, said latch lock further comprising a manually operable release bar engaging said locking mechanism of said latch lock and operable to disengage said locking mechanism.

17. The protective cabinet of claim 16, further comprising a key lock assembly and a key-actuated release bar actuator operatively attached to said key lock assembly.

18. The protective cabinet of claim 17, wherein said key lock assembly is positioned out of alignment with said locking mechanism of said latch lock.

19. The protective cabinet of claim 1, wherein the sheet of hardened protective material is removable and replaceable from the cabinet.

20. The protective cabinet of claim 1, wherein the bottom wall comprises corner cutouts that allow wheels to engage a floor while still allowing the bottom-most edge of the cabinet to remain immediately adjacent to the floor.

21. The protective cabinet of claim 13, wherein the mounting bracket is first mounted to one of the side walls of the protective cabinet at a position that is forward of the intermediate wall and protects the mounting assembly of the latch assembly from being accessed or damaged from the opposite side of the protective cabinet.

22. The protective cabinet of claim 1, wherein the cabinet has a width dimension that is larger than a perimeter of the point of ingress such that the side walls of the cabinet are positioned outside of the point of ingress opening when the cabinet is locked in position.

23. The protective cabinet of claim 1, wherein the top wall is positioned above the point of ingress when the cabinet is locked in position.

24. The protective cabinet of claim 11, wherein said visual psychological deterrent further comprises a mirrored surface on said intermediate wall back side.

* * * * *